(12) United States Patent
Poledna

(10) Patent No.: US 10,243,880 B2
(45) Date of Patent: Mar. 26, 2019

(54) TIME-TRIGGERED CUT THROUGH METHOD FOR DATA TRANSMISSION IN DISTRIBUTED REAL-TIME SYSTEMS

(71) Applicant: FTS Computertechnik GmbH, Vienna (AT)

(72) Inventor: Stefan Poledna, Klosterneuburg (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 341 days.

(21) Appl. No.: 15/293,874

(22) Filed: Oct. 14, 2016

(65) Prior Publication Data
US 2017/0111293 A1   Apr. 20, 2017

(30) Foreign Application Priority Data
Oct. 16, 2015 (AT) .............................. A 50883/2015

(51) Int. Cl.
*G06F 15/173* (2006.01)
*H04L 12/911* (2013.01)
(Continued)

(52) U.S. Cl.
CPC .......... *H04L 47/826* (2013.01); *H04L 12/417* (2013.01); *H04L 47/781* (2013.01); *H04L 47/801* (2013.01)

(58) Field of Classification Search
CPC ... H04L 47/826; H04L 47/781; H04L 47/801; H04L 12/417
See application file for complete search history.

(56) References Cited

U.S. PATENT DOCUMENTS 7,215,637 B1 * 5/2007 Ferguson ................ H04L 45/00
370/230.1
2004/0081079 A1 * 4/2004 Forest .................... H03M 13/43
370/216

(Continued)

*Primary Examiner* — Jonathan A Bui
(74) *Attorney, Agent, or Firm* — Eversheds Sutherland (US) LLP

(57) ABSTRACT

The invention relates to a method for the periodic transport of real-time data in a distributed computer system, which computer system comprises node machines (100, 101, 102, 103), in particular a plurality of node machines (100, 101, 102, 103), and distributor units (121, 122), in particular a plurality of distributor units (121, 122), wherein the node machines (100, 101, 102, 103) and the distributor units (121, 122) have access to a global time, and wherein real-time data is transported by means of time-triggered real-time messages. It is provided that for at least one distributor unit (121, 122), preferably for all the distributor units (121, 122), through which a time-triggered real-time message is to be transported, attributes of this time-triggered real-time message are assigned a priori to a periodic time slot of the at least one distributor unit (121, 122), preferably to a respective time slot (121, 122) of each distributor unit (121, 122), in which periodic time slot or in which periodic time slots, this time-triggered real-time message is to be transported through the distributor unit (121, 122) or the distributor units (121, 122), and wherein, on the basis of attributes that are assigned a priori to this time slot and that are preferably stored in the distributor unit (121, 122), a message arriving in a periodic time slot in a distributor unit (121, 122) is forwarded, immediately after the beginning of the arrival of the message in the distributor unit (121, 12), to one or more output ports of the distributor unit (121, 122), which is/are specified in the attributes assigned to the time slot.

12 Claims, 1 Drawing Sheet

Figure 1:
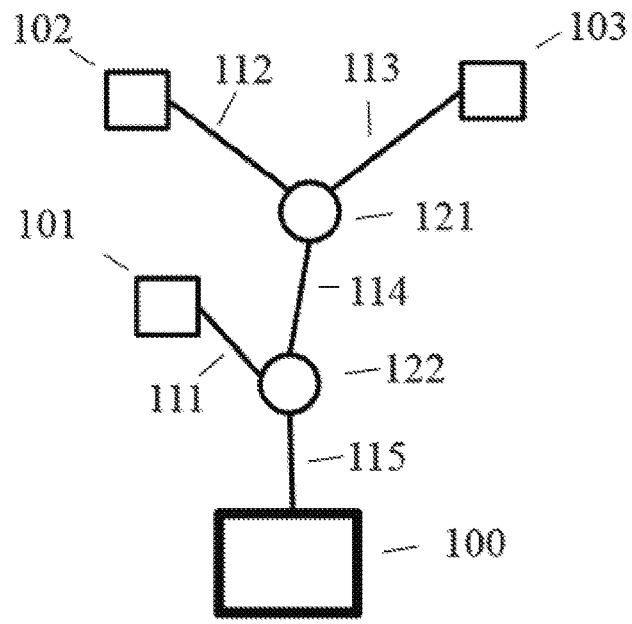

(51) Int. Cl.
    *H04L 12/417*     (2006.01)
    *H04L 12/927*     (2013.01)

(56) References Cited

U.S. PATENT DOCUMENTS

| | | | |
|---|---|---|---|
| 2005/0002405 A1* | 1/2005 | Gao | G06F 13/102 |
| | | | 370/401 |
| 2007/0058661 A1* | 3/2007 | Chow | H04L 12/413 |
| | | | 370/445 |
| 2010/0124933 A1* | 5/2010 | Chowdhury | H04L 41/0896 |
| | | | 455/453 |
| 2012/0026951 A1* | 2/2012 | Mace | H04L 47/801 |
| | | | 370/329 |
| 2012/0117228 A1* | 5/2012 | Gabriel | H04L 47/00 |
| | | | 709/224 |
| 2016/0134560 A1* | 5/2016 | Aldebert | H04L 47/801 |
| | | | 370/389 |

* cited by examiner

TIME-TRIGGERED CUT THROUGH METHOD FOR DATA TRANSMISSION IN DISTRIBUTED REAL-TIME SYSTEMS

The invention relates to a method for the periodic transport of real-time data in a distributed computer system, which computer system comprises node machines, in particular a plurality of node machines, and distributor units, in particular a plurality of distributor units, wherein the node machines and the distributor units have access to a global time, and wherein real-time data are transported by means of time-triggered real-time messages, wherein time-triggered real-time messages are transported in the distributor units in periodic time slots.

Furthermore, the invention relates to a computer system, in particular to a distributed real-time computer system, for the periodic transport of real-time data, wherein the computer system comprises node machines, in particular a plurality of node machines, and distributor units, in particular a plurality of distributor units, wherein the node machines and the distributor units have access to a global time, and wherein real-time data is transported by means of time-triggered real-time data messages, wherein time-triggered real-time data messages are transported in the distributor units in periodic time slots.

In many real-time systems particularly in the field of control technology, periodic processes are implemented [3]. In a distributed real-time computer system, a temporally repeating periodic process section is referred to as a Frame.

In a distributed real-time computer system, a frame starts with the synchronized observation of a technical process, for example, by means of spatially distributed sensors, in order to acquire the state of this technical process at a predetermined time.

To each sensor, preferably one node machine is assigned, wherein the sensor and the node machine can be designed as separate components and connected to one another, or the sensor and the node machine are designed as one component ("intelligent sensor").

The observation of a technical process can occur synchronously only if all the node machines, which are arranged as a rule in a decentralized manner, have access to a global time. For example, the internal clock synchronization contained in the time-triggered TTEthernet protocol [2] can be used for setting up a global time in all the components of a distributed real-time system, in particular of a distributed real-time computer system. Since it is possible to synchronize the internal Ethernet time with an external time standard, for example, GPS, the Ethernet time can also ensure the synchronization of the sensors if an external synchronization is required.

The node machines arranged with the sensors or assigned to the sensors, or the intelligent sensors carry out a first preprocessing of the sensor data and send these preprocessed sensor data, particularly in a periodically recurring time slot, in the form of real-time messages via a real-time communication system to a central control unit. The evaluation of the arriving sensor data in the central control unit makes it possible to acquire the current state of the technical processes observed and specify (new) target values for actuators present.

In the case of a rapid technical process, frames that last as briefly as possible have to be implemented. The duration of a frame is determined by the sum of the transport durations of the real-time messages and the processing durations of the real-time data.

A real-time message is understood to mean a message that contains real-time data and that should arrive within a predetermined time interval (real-time interval) at a receiver.

In a network, a distinction is made between two message transport methods, the store-and-forward method and the cut-through method [1]. In the store and forward method, an arriving message is buffered as a whole in a distributor unit, before it is forwarded by the distributor unit in the direction of the destination thereof.

In accordance with the prior art, in the case of the cut-through method, after evaluation of the first part of the message in the distributor unit, the message header, in which the attributes of the message such as message type, destination address and sender address are contained, the forwarding of the message in the direction of the destination thereof is already started, before the entire message has arrived in the distributor unit. The cut-through method therefore has a shorter pass-through interval of the message in a distributor unit than the store-and-forward method.

An aim of the method is to provide a method and a computer system for keeping the transport durations of real-time messages, which have to be transported via a time-triggered network comprising in particular a plurality of connected distributor units, short.

This aim is achieved with a method mentioned at the beginning and with a computer system mentioned at the beginning, in that, according to the invention, attributes of time-triggered real-time messages are assigned a priori to the periodic time slots of a distributor unit, in which periodic time slots these time-triggered real-time messages are to be transported through the distributor unit, and preferably stored in the distributor unit, and wherein the attributes that are assigned to a periodic time slot indicate the output port or the output ports of the distributor unit, to which a time-triggered real-time message arriving in the periodic time slot in the distributor unit is to be forwarded in the distributor unit, and wherein, after the beginning of the arrival of the message in the distributor unit, in particular immediately after the beginning of the arrival, and, namely, immediately after the arrival of the start of a header of the arriving message, a message arriving in a periodic time slot in the distributor unit is forwarded to the output port or to the output ports of the distributor unit, which is/are specified in the attributes assigned to the periodic time slot.

Furthermore, the aim can be attained by means of a distributor unit, which is set up in order to implement the above-described measures.

According to the invention, a modified, time-triggered cut-through method is instituted. In accordance with this method, attributes such as, for example, the destination address, of a time-triggered real-time message are assigned a priori to the periodic time slot, in which time slot the periodic time-triggered real-time message will be transported by a distributor unit. After the arrival of the start of a message in a time slot, it is therefore not necessary, as in the known cut-through method, to wait until the attributes stored in the header of the arriving message can be accessed; instead, on the basis of the attributes stored a priori, it is possible to start immediately with the forwarding of the message arriving in the distributor unit in the direction of the destination thereof (for example, to which output port, or to which output port of the distributor unit), since, due to the time-triggered transfer of the real-time message, the distributor unit can assume that the message arriving in a periodic time slot is the real-time message that comprises the attributes comprising this periodic time slot.

Preferably, the expression "immediately after the arrival of the start of a header of the arriving message" should be understood to mean that, in any case, even before the header has arrived completely, the arriving message is forwarded, at least the forwarding has already been started.

In particular, it should preferably be understood to mean that, in the context of the technical possibilities, as rapidly as possible after the arrival of the start of the header, the forwarding occurs or the forwarding is started.

The pass-through interval of messages in a distributor unit or through a distributor unit is largely eliminated in this novel method. As a result, the transport duration of the messages through the network are reduced to the physically predetermined signal transit times.

Preferred designs of the method or computer system according to the invention, which in each case can be implemented separately by themselves or in any combination, are listed below:

a verification is carried out—preferably by each distributor unit through which a message passes—, in order to determine whether the attributes contained in a header of a message passing through the distributor unit agree with the attributes that are assigned to the periodic time slot in which the message passing through has arrived in the distributor unit and that are preferably stored in the distributor unit;

in the case in which the attributes of the message passing through do not agree with the attributes assigned to the periodic time slot, the current message transport of the message is interrupted, preferably by the distributor unit;

messages that do not arrive in a periodic time slot for time-triggered real-time messages in the distributor unit are verified—preferably by distributor unit—, and, in the case in which at least one attribute, preferably all of the attributes, of this message indicates/indicate that the message is a time-triggered real-time message, this message is buffered until the periodic time slot for the forwarding of the time-triggered real-time message;

the at least one distributor unit, preferably all the distributor units, does not occupy or do not occupy time slots that are provided for a time-triggered real-time message with any other message;

the at least one distributor unit, preferably all the distributor units, carries out or carry out the message transport for time-triggered real-time messages in accordance with the TTEthernet protocol.

In the time interval between the beginning of the sending of a message by a node machine or by a distributor unit, and the end of the sending of this message, the message is referred to as outgoing message with respect to this node machine or this distributor unit.

In the time interval between the beginning of the reception of a message at a node machine or a distributor unit, and the end of the reception of this message, the message is referred to as incoming/arriving message with respect to this node machine or this distributor unit.

The present invention is explained in further detail using an example in reference to the following drawing. In the drawing FIG. 1 shows the structure of a simple real-time computer system, and FIG. 2 shows the format of a typical network message.

FIG. 1 shows a simple computer system or computer network, in particular a distributed real-time computer system, with four node machines 100, 101, 102, 103 and two distributor units 121, 122. A data line 115 connects the node machine 100 to the distributor unit 122, a data line 111 connects the node machine 101 to the distributor unit 122, a data line 112 connects the node machine 102 to the distributor unit 121, a data line 113 connects the node machine 103 to the distributor unit 121, and a data line 114 connects the distributor unit 121 to the distributor unit 122.

Figure 2:
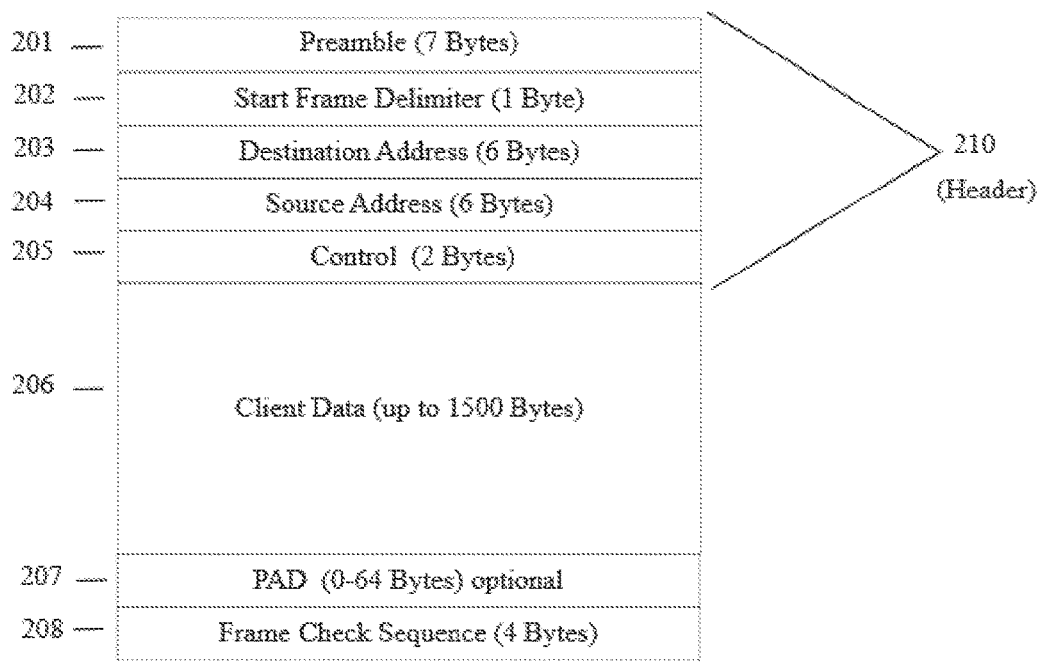

FIG. 2 shows the format of a typical network message as it occurs, for example, in TTEthernet [2]. The Preamble 201 is followed by the Start Delimiter 202, the destination address 203, the start address 204, and a control field 205, which can indicate the length of the message. The fields 201, 202, 203, 204, 205 are referred to as header 210 of the message. Adjoining the header there is the Payload 206, which is the area of the user data. If only a few bytes of user data are present, then the message with the field 207 should be stretched over a minimum length. At the end of the message, the Frame Check Sequence 208 is located. In FIG. 2, the fields 103, 104, 105 contain the Attributes of the message. These attributes are preferably contained in the header 110 of the message.

In accordance with the prior art [1], in the known cut-through method, after the arrival of the message start in a distributor unit, for example, the first 20 bytes of a message have to be waited for, before it can be decided to which output port of the distributor unit the message has to be forwarded.

In the present invention, real-time data is now transferred by means of time-triggered real-time messages in the computer system. If one considers a certain distributor unit, then it is provided that a certain time-triggered real-time message is transported in a certain time slot by this distributor unit. According to the invention, the attributes of such a real-time message are therefore stored a priori in the distributor unit and assigned to the periodic time slot in which this real-time message is expected in this distributor unit.

Immediately after the arrival of the start of a message in a distributor unit, this message is therefore forwarded to the output port or to the output ports of the distributor unit, without buffering, and without having to wait until the attributes can be read from the arriving real-time message.

In order to prevent that another message than the expected real-time message is forwarded on the basis of the stored attributes, it is preferably provided that the distributor unit verifies during the sending whether the attributes contained in the header of the message passing through the distributor unit agree with the attributes of the expected time-triggered real-time message, which are stored a priori in the distributor unit, and, if this is not the case, the distributor unit interrupts the current message transport of the message passing through. Since, as a result, the receiver of an interrupted message does not receive a correct Frame Check Sequence 108, it will reject this message.

In a computer system as shown in FIG. 1, the case can occur that, for example, the node machine 102 sends a time-triggered real-time message before the time slot that is provided a priori for this time-triggered real-time message in the distributor unit 121 to the distributor unit 121. In this case, the distributor unit 121 will buffer the time-triggered real-time message until the time-slot provided for this time-triggered real-time message starts.

In FIG. 1, the case can also occur in which, for example, the node machine 102 starts to send a time-triggered real-time message and at the same time the node machine 103 starts to send a store-and-forward message via the distributor units 121 and 122 to the control machine 100. In order to prevent that the distribution unit 121 or the distribution unit 122 occupies the respective time slot known a priori, which is provided for a certain time-triggered real-time message, with another message, it is preferably established that a distributor unit is not allowed to occupy a time slot that is provided for a certain time-triggered real-time message with any other message.

In distributed real-time systems, in particular in distributed real-time computer systems, the result due to the present invention is a significant reduction of the data transmission time. The associated essential improvement of the control technology is of great economic importance.

CITED REFERENCES

[1] Wikipedia, Switch. URL: https://de.wikipedia.org/wiki/Switch (Netzwerktechnik)
[2] SAE Standard AS6802 von TT Ethernet. URL: http://standards.sae.org/as6802
[3] Kopetz, H. *Pulsed Data Streams. In: From Model Driven Design to Resource Management for Distributed Embedded Systems*. Ed.: B. Kleinjohann et al. IFIP Series Vol. 225, Pp. 105-114. Springer Verlag. 2006.

The invention claimed is:

1. A method for the periodic transport of real-time data in a distributed computer system comprising a plurality of node machines (100, 101, 102, 103) and a plurality of distributor units (121, 122), wherein the plurality of node machines (100, 101, 102, 103) and the plurality of distributor units (121, 122) have access to a global time, and wherein real-time data is transported by time-triggered real-time messages, wherein the time-triggered real-time messages are transported in the plurality of distributor units in periodic time slots, the method comprising:
    assigning attributes of the time-triggered real-time messages a priori to the periodic time slots of a distributor unit (121, 122) of the plurality of distributor units, wherein the time-triggered real-time messages are transported by the distributor unit (121, 122) from the periodic time slots, and stored in the distributor unit (121, 122), and wherein the attributes assigned to a periodic time slot of the periodic time slots indicate the output port or the output ports of the distributor unit (121, 122), to which a time-triggered real-time message arriving in the periodic time slot in the distributor unit (121, 122) is forwarded in the distributor unit (121, 122), and
    immediately after the beginning of the arrival of the time-triggered real-time message in the distributor unit (121,122) and immediately after the arrival of a start of a header of the arriving time-triggered real-time message, forwarding the time-triggered real-time message arriving in the periodic time slot in the distributor unit (121, 122) to the output port or to the output ports of the distributor unit (121, 122), which are specified in the attributes assigned to the periodic time slot.

2. The method according to claim 1, wherein a verification is carried out by the distributor unit (121, 122) through which the time-triggered real-time message passes in order to determine whether the attributes contained in the header (110) of the time-triggered real-time message passing through the distributor unit (121, 122) agree with the attributes that are assigned to the periodic time slot in which the message passing through has arrived in the distributor unit (121, 122) and that are stored in the distributor unit (121, 122).

3. The method according to claim 2, wherein in the case in which the attributes of the time-triggered real-time message passing through do not agree with the attributes assigned to the periodic time slot, the transport of the time-triggered real-time message is interrupted by the distributor unit (121, 122).

4. The method according to claim 1, wherein messages that do not arrive in the periodic time slot for time-triggered real-time messages in the distributor unit (121, 122) are verified by the distributor unit (121, 122) and, in the case in which at least one attribute of the messages indicates that the messages are the time-triggered real-time messages, the messages are buffered until the periodic time slot for the forwarding of the time-triggered real-time-messages.

5. The method according to claim 1, wherein the distributor unit (121, 122) does not occupy time slots that are provided for the time-triggered real-time message with any other message.

6. The method according to claim 1, wherein the distributor unit (121, 122) carries out the message transport for the time-triggered real-time messages in accordance with the TTEthernet protocol.

7. A distributed real-time computer system for the periodic transport of real-time data, wherein the distributed real-time computer system comprises:
    a plurality of node machines (100, 101, 102, 103); and
    a plurality of distributor units (121, 122),wherein the plurality of node machines (100, 101, 102, 103) and the plurality of distributor units (121, 122) comprise hardware configured to have access to a global time, and wherein the real-time data is configured to be transported by time-triggered real-time messages, wherein the time-triggered real-time messages are configured to be transported in the plurality of distributor units in periodic time slots,
    wherein attributes of the time-triggered real-time messages are configured to be assigned a priori to the periodic time slots of a distributor unit (121, 122) of the plurality of distributor units, wherein the time-triggered real-time messages are configured to be transported through the distributor unit (121, 122) from the periodic time slots, and stored in the distributor unit (121, 122), and wherein the attributes assigned to a periodic time slot of the periodic time slots indicate the output port or the output ports of the distributor unit (121, 122), to which a time-triggered real-time message arriving in the periodic time slot in the distributor unit (121, 122) is forwarded in the distributor unit (121, 122), and
    immediately after the beginning of the arrival of the time-triggered real-time message in the distributor unit (121,122) and immediately after the arrival of a start of a header of the arriving time-triggered real-time message, the time-triggered real-time message arriving in the periodic time slot in the distributor unit is configured to be forwarded to the output port or to the output ports of the distributor unit (121, 122), which are specified in the attributes assigned to the periodic time slot.

8. The computer system according to claim 7, wherein a verification is configured to be carried out by the distributor unit (121, 122) through which the time-triggered real-time message passes in order to determine whether the attributes contained in the header (110) of the time-triggered real-time message passing through the distributor unit (121, 122) agree with the attributes that are assigned to the periodic time slot in which the time-triggered real-time message passing through has arrived in the distributor unit (121, 122) and that are stored in the distributor unit (121, 122).

9. The computer system according to claim 8, wherein in the case in which the attributes of the time-triggered real-time message passing through do not agree with the attributes assigned to the periodic time slot, the transport of the time-triggered real-time message is configured to be interrupted, by the distributor unit (121, 122).

10. The computer system according to claim 7, wherein messages that do not arrive in the periodic time slot for the time-triggered real-time messages in the distributor unit (121, 122) are configured to be verified by the distributor unit (121, 122) and, in the case in which at least one attribute of the message indicates that the messages are the time-triggered real-time message, the messages are configured to be is buffered until the periodic time slot for the forwarding of the time-triggered real-time message.

11. The computer system according to claim 7, wherein the distributor unit (121, 122) does not occupy time slots that are provided for the time-triggered real-time message with any other message.

12. The computer system according to claim 7, wherein the distributor unit (121, 122) is configured to carry out the message transport for the time-triggered real-time messages in accordance with the TTEthernet protocol.

* * * * *